United States Patent [19]

Hayashi et al.

[11] Patent Number: 4,710,972

[45] Date of Patent: Dec. 1, 1987

[54] SHF RECEIVER

[75] Inventors: Toshihide Hayashi, Tokyo; Osamu Yamakami; Ikuo Kanayama, both of Kanagawa, all of Japan

[73] Assignee: Sony Corporation, Tokyo, Japan

[21] Appl. No.: 914,305

[22] Filed: Oct. 2, 1986

[30] Foreign Application Priority Data

Oct. 21, 1985 [JP] Japan .................. 60-234976

[51] Int. Cl.$^4$ .................. H04B 11/16; F29Q 23/08
[52] U.S. Cl. .................. 455/179; 455/3; 455/161; 455/168
[58] Field of Search .................. 455/161, 166, 168, 180, 455/179, 3, 277, 4, 7

[56] References Cited

U.S. PATENT DOCUMENTS

| | | | |
|---|---|---|---|
| 3,931,623 | 1/1976 | Sones | 455/7 |
| 4,232,397 | 11/1980 | Murata et al. | 455/179 |
| 4,392,247 | 7/1983 | Van Deursen | 455/161 |
| 4,509,198 | 4/1985 | Nagatomi | 455/4 |
| 4,527,281 | 7/1985 | Imagawa et al. | 455/168 |
| 4,538,175 | 8/1985 | Baibes et al. | 455/3 |
| 4,592,093 | 5/1986 | Ouchi et al. | 455/4 |

Primary Examiner—Robert L. Griffin
Assistant Examiner—Curtis Kuntz
Attorney, Agent, or Firm—Lewis H. Eslinger; Alvin Sinderbrand

[57] ABSTRACT

A superhigh frequency (SHF) receiver for receiving satellite broadcast signals having different planes of polarization for adjacent or odd- and even-numbered channels, respectively, is operative, upon sequential channel selection, to sequentially select alternate or every other channel, for example, the odd-numbered channels, having a first plane of polarization, and then to automatically switch the receiving plane of polarization of a polarizer and sequentially select the other alternate channels, for example, the even-numbered channels, having a second plane of polarization. Thus, the user does not have to switch the plane of polarization of the polarizer for receiving the satellite broadcast signal and the plane of polarization of the polarizer needs to be changed only once when scanning the full array of channels so that channel selection can be carried out at higher speed.

5 Claims, 10 Drawing Figures

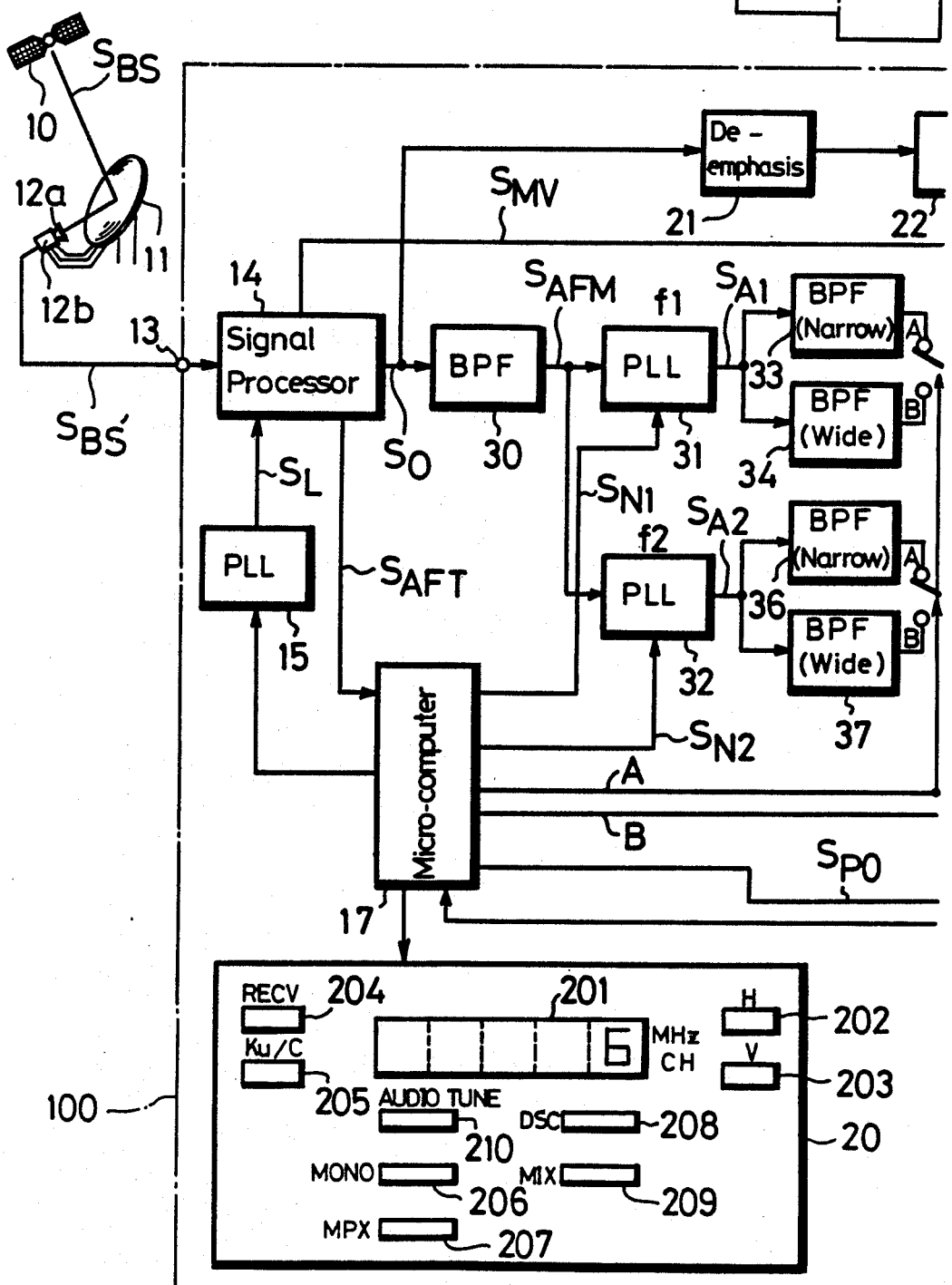
FIG. 3-I

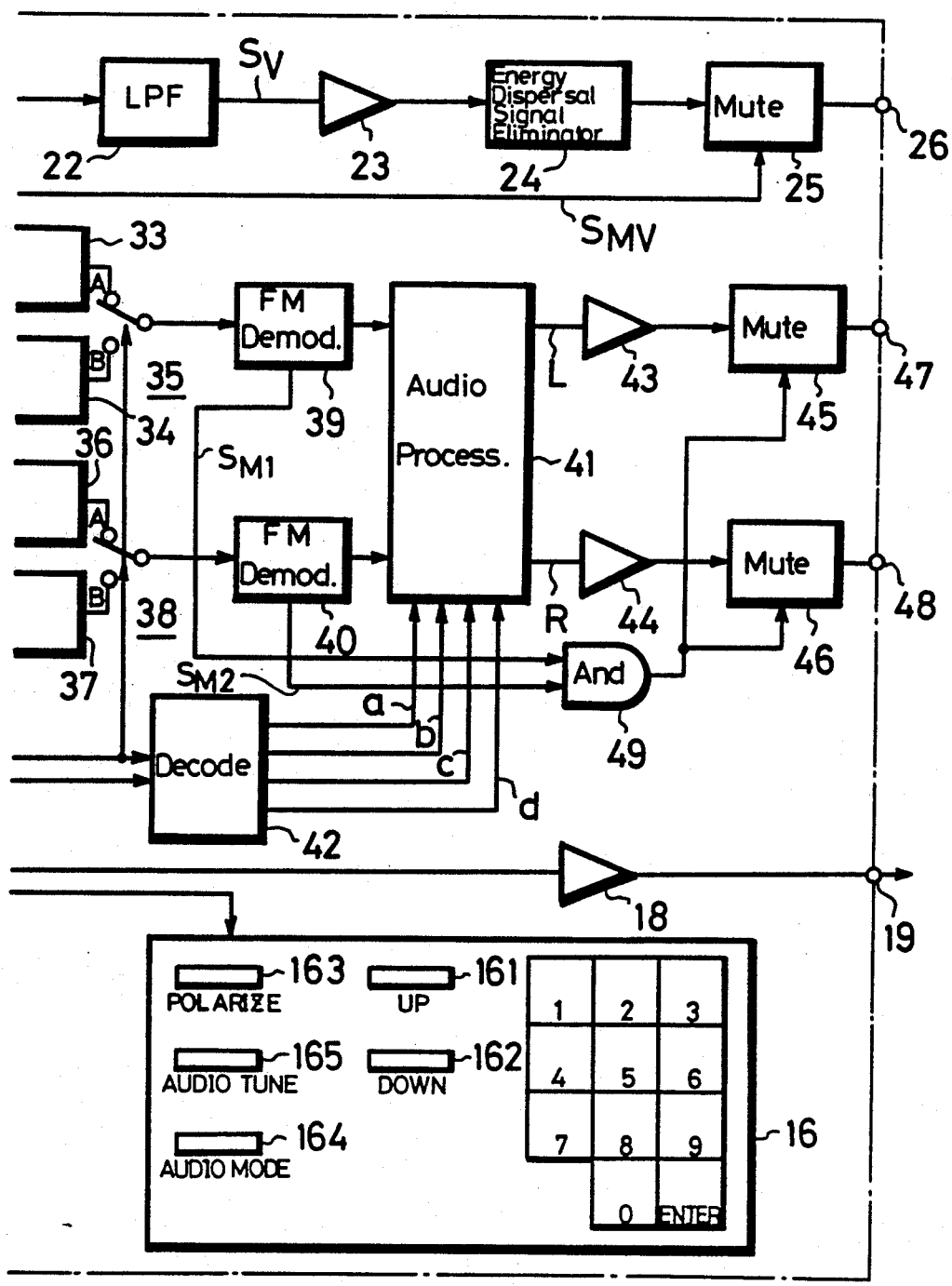
FIG. 3-II (MHz)

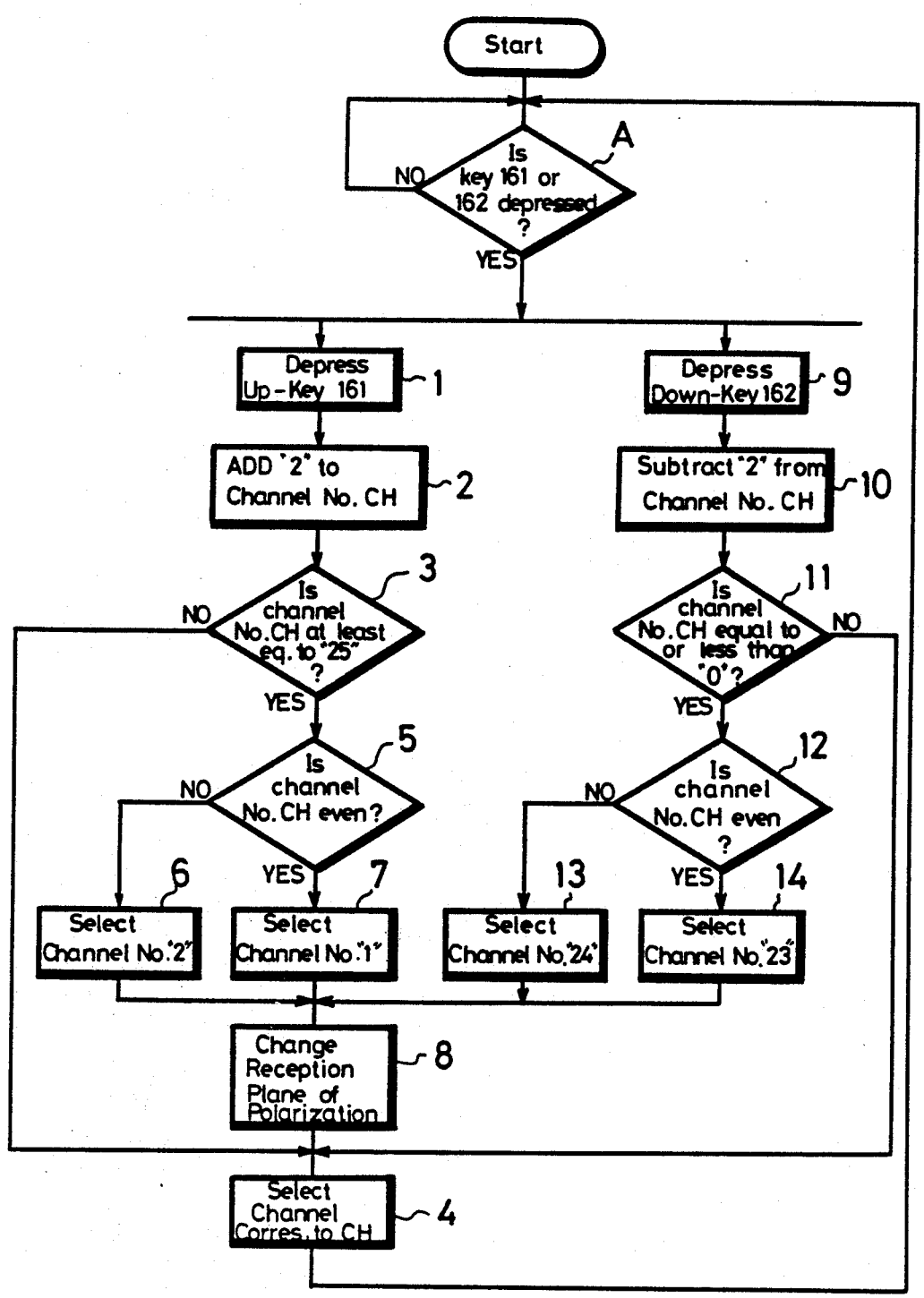

SHF RECEIVER

BACKGROUND OF THE INVENTION

1. Field of the Invention

This invention relates generally to a superhigh frequency (SHF) receiver, and more particularly is directed to an SHF receiver which can receive satellite broadcast signals having different planes of polarization for adjacent channels.

2. Description of the Prior Art

In the case of satellite broadcasting, while the necessary band width of each channel is, for example, 27 MHz, the frequency spacing between adjacent channels is smaller than such band width, for example, is about 20 MHz, as shown on FIG. 1. Accordingly, in order to avoid radio interference between adjacent channels, it is known to make the planes of polarization of the satellite broadcast signals different for adjacent channels. By way of example, use has been made of a horizontal polarized wave and a vertical polarized wave, or a clockwise circular polarized wave and a counter-clockwise circular polarized wave, and so on.

In an SHF receiver according to the prior art which receives satellite broadcast signals having different planes of polarization for adjacent channels, when all the channels are sequentially selected, the channel selection is carried out in the sequential order of channel 1, channel 2, channel 3 ... etc. In such case, for each channel change, the receiving plane of polarization of a polarizer is automatically changed-over so that the channel selection speed is necessarily slow. Alternatively, it has been proposed to provide an SHF receiver in which the receiving plane of polarization of the polarizer is fixed and alternate channels, for example, the odd-numbered channels, are selected sequentially. In this SHF receiver, when the other alternate channels, for example, the even-numbered channels, are selected, the user has to manually change-over the receiving plane of polarization of the polarizer and this is very bothersome for the user.

OBJECTS AND SUMMARY OF THE INVENTION

Accordingly, it is an object of this invention to provide an improved SHF receiver which can avoid the above-mentioned problems encountered with the prior art.

It is another object of this invention to provide an SHF receiver which can free the user from the need to perform bothersome operations, such as, switching the receiving plane of polarization of a polarizer and so on.

It is a further object of this invention to provide an SHF receiver, as aforesaid, which can sequentially select the channels at a high channel selection speed.

According to an aspect of the present invention, an apparatus for receiving satellite broadcast signals having a first plane of polarization for alternate first channels and a second plane of polarization for the second channels therebetween, comprises: antenna means for receiving said satellite broadcast signals; polarizer means for receiving a satellite broadcast signal derived from said antenna means and having a plane of polarization adapted to be switched for correspondence with the plane of polarization of the received satellite broadcast signal; channel selecting means for continuously selecting the channels of said satellite broadcast signals; means for tuning to a channel selected by said channel selecting means; and controlling means for controlling the tuning of said tuning means and the switching of the plane of polarization of said polarizer means in accordance with a channel selected by said channel selecting means, said controlling means causing said tuning means to tune first to every other channel, that is, alternate channels having the same plane of polarization, in series, and thereafter switching the plane of polarization of said polarizer means and causing tuning in series to the other alternate channels all having another plane of polarization.

The above, and other objects, features and advantages of the present invention, will become apparent from the following detailed description of a preferred embodiment which is to be read in conjunction with the accompanying drawings, throughout which the same reference numerals are used to designate like elements and parts.

BRIEF DESCRIPTION OF THE DRAWINGS

FIG. 3 (formed of FIGS. 3-I and 3-II) is a block diagram showing a satellite broadcasting receiver according to an embodiment of the present invention;

FIG. 6, is a flow chart to which reference will be made in explaining the operation of the SHF receiver according to the invention in selecting the channels in sequence.

DESCRIPTION OF THE PREFERRED EMBODIMENT

Before describing a preferred embodiment of the present invention, the fundamental principle of the invention will be briefly described below with reference to FIG. 2.

Figure 2:
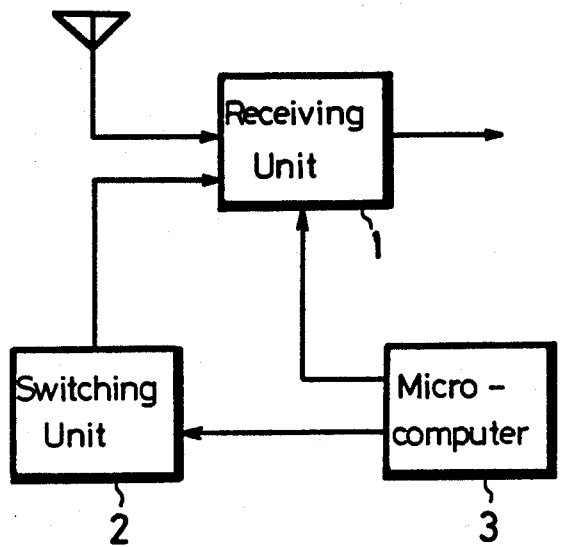
FIG. 2 is a block diagram broadly showing the principle of the present invention.

In FIG. 2, a SHF receiver according to this invention is shown to comprise a receiving unit 1 for receiving satellite broadcast signals having different planes of polarization (for example, horizontal and vertical planes of polarization) for the adjacent channels, a switching unit 2 for changing-over the receiving plane of polarization of the receiving unit 1, and a controller, for example, a micro-computer 3, for controlling the operations of the receiving unit 1 and the switching unit 2. In response to the control by controller 3, receiving unit 1 sequentially selects every other channel, for example, the odd-numbered channels, whose satellite broadcast signals have a first polarization plane. Then, the switching unit 2 changes-over the receiving polarization plane from the first polarization plane to a second polarization plane and, thereafter, the receiving unit 1 sequentially selects the remaining alternate channels, for example, the even-numbered channels, whose satellite broadcast signals have the second plane of polarization.

As set forth above, after the alternate channels whose satellite broadcast signals having the first plane of polarization have been sequentially selected, the receiving plane of polarization is switched and then the other alternate channels whose satellite broadcast signals have the second plane of polarization are sequentially selected. Thus, although all the channels are eventually selected or scanned, the receiving plane of polarization is switched only once. Further, such switching of the receiving plane of polarization can be easily effected automatically.

Now, an embodiment of an SHF receive according to the present invention will be described in detail with reference to FIG. 3 (formed of FIGS. 3-I and 3-II on two sheets of drawings so as to be of sufficiently large scale).

In FIG. 3, a satellite broadcast signal $S_{BS}$ of the ku band (12 GHz band ranging from 11.7 to 12.2 GHz) or the c band (4 GHz band ranging from 3.7 to 4.2 GHz) is transmitted from a broadcasting satellite 10 and supplied through a BS antenna 11 to a polarizer 12a. This polarizer 12a may be of a well known type, for example, as is disclosed in U.S. Pat. No. 4,414,516. The satellite broadcast signal $S_{BS}$ received by polarizer 12a is supplied to a super-high frequency/ultra-high frequency (S/U) converter 12b. In S/U converter 12b, the satellite broadcast signal $S_{BS}$ is frequency-converted to a signal $S_{BS'}$ having a frequency of 950 to 1450 MHz with respect to both the ku band and the c band.

In other words, a local frequency suitably provided in the S/U converter 12b for frequency conversion is selectively provided with a frequency of 10.75 GHz for the ku band or with a frequency of 2.75 GHz for the c band. Although FIG. 3 shows a single system comprised of the BS antenna 11 and the S/U converter 12b, in practice, for the reception of the ku band and the c band, different respective systems, each formed of a BS antenna and an S/U converter, may be employed with a suitable arrangement being provided for selecting one system or the other and providing the respective local frequency.

Figure 4:
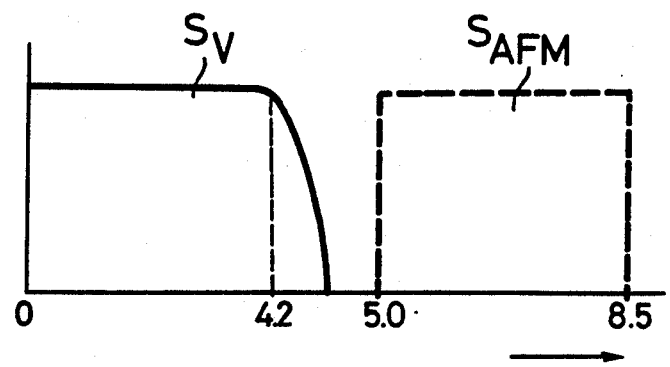
FIG. 4 is schematic representation showing a format of a satellite broadcast signal.

As shown in FIG. 4, the satellite broadcast signal $S_{BS}$ is a signal in which a video signal Sv, whose highest frequency is 4.2 MHz, is frequency-multiplexed with an FM audio signal $S_{AFM}$ whose carrier wave is in a frequency band above the highest frequency of this video signal Sv, for example, in a 5 to 8.5 MHz band, and the carrier wave of 12 GHz or 4 GHz for the ku band or the c band, respectively, is frequency-modulated with the signals Sv and $S_{AFM}$. Accordingly, the signal $S_{BS}$, is also an FM signal.

The satellite broadcast signal $S_{BS}$ can have any one of 4 audio modes, such as, (1) a monaural mode; (2) a multiplex mode; (3) a discrete mode; and (4) a matrix mode.

The FM audio signal $S_{AFM}$ in the case of the monaural mode is a monaural audio signal $S_A$ which results from frequency-modulating a single carrier wave of 5 to 8.5 MHz. The frequency deviation thereof is suitably selected, for example, as 75 kHz. The FM audio signal $S_{AFM}$ in the case of the multiplex mode is a composed signal which results from mixing a sum signal (L+R) of a left audio signal L and a right audio signal R and a signal which results from frequency-modulating a single sub-carrier by a difference signal (L−R). In this case, the single carrier wave to be frequency modulated again has a frequency in the 5 to 8.5 MHz band, and its frequency deviation is suitably selected, for example, as 100 kHz.

The FM audio signal $S_{AFM}$ in the case of the discrete mode is formed by frequency-modulating first and second carrier waves of 5 to 8.5 MHz band by the left audio signal L and the right audio signal R, respectively. The frequency deviation of each carrier wave is suitably selected, for example, as 75 kHz. In this case, the spacing between the frequencies of the first and second carrier waves is selected, for example, as 0.18 MHz. Further, the FM audio signal $S_{AFM}$ in the case of the matrix mode results from frequency-modulating first and second carrier waves in the 5 to 8.5 MHz band by the sum signal (L+R) and the difference signal (L−R), respectively. The frequency deviation of each carrier wave is suitably selected, for example, as 100 kHz. In this case, the spacing between the first and second carrier waves is frequently selected to be 1.00 MHz.

Figure 5A:
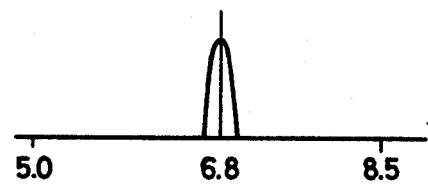
FIGS. 5A to 5D are diagrams showing the positions of carrier waves of FM audio signals for respective modes.
Figure 5B:
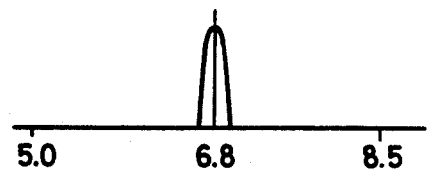
Figure 5C:
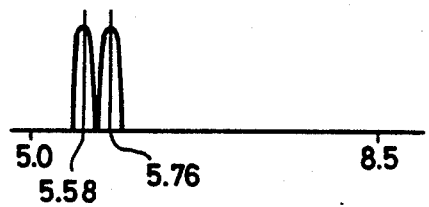
Figure 5D:
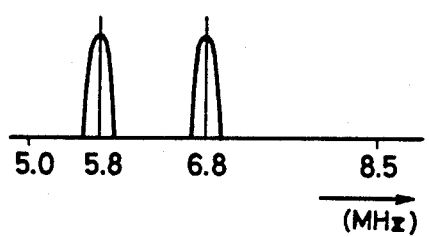

The positions of the carrier waves in the FM audio signal $S_{AFM}$ are not standardized for the several modes, and thus they may be placed at any given positions in the range from 5.0 to 8.5 MHz. The positions at which the carrier waves are placed most frequently will be indicated below with reference to FIGS. 5A to 5D, respectively. In the case of th monaural mode and the multiplex mode (FIGS. 5A and 5B), the single carrier wave is positioned at 6.80 MHz; in the case of the discrete mode (FIG. 5C), the carrier waves are positioned at 5.58 MHz and 5.76 MHz; and, in the case of the matrix mode (FIG. 5D), the carrier waves are positioned at 5.80 MHz and 6.80 MHz.

Figure 1:
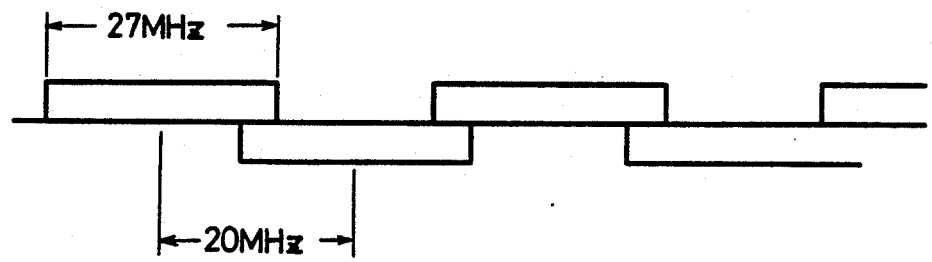
FIG. 1 is a schematic representation to which reference is made in explaining the necessity of the switching of the planes of polarization.

By way of example, the number of channels available for the ku band and the c band is 24 channels. As earlier noted, the planes of polarization of the satellite broadcast signals for the respective channels are made different for the adjacent channels. For example, the odd-numbered channels, such as channels 1,3, ... ,23 have horizontal planes of polarization, while the even-numbered channels, such as, channels 2,4, ... ,24 have vertical planes of polarization, respectively. The foregoing ensures that although the necessary band width per channel is, for example, 27 MHz, and the frequency spacing between the adjacent channels is only about 20 MHz, as shown on FIG. 1, radio interference between the adjacent channels will be avoided.

Referring again to FIG. 3, it will be seen that the signal $S_{BS'}$ from S/U converter 12b is supplied through a terminal 13 to a signal processor 14 provided in a receiver 100. In signal processor 14, the signal $S_{BS'}$ having a frequency ranging from 950 to 1450 MHz is converted to an intermediate frequency signal having a frequency of, for example, 402.78 MHz, and then FM-demodulated and thereby delivered as a mixed signal $S_O$ which is formed of the video signal Sv and the FM audio signal $S_{AFM}$ shown in FIG. 4.

The received channel is selected by changing a local signal $S_L$ supplied to processor 14 from a PLL (phase locked loop) circuit 15 for frequency conversion of the signal $S_{BS'}$. The PLL circuit 15 is controlled by a microcomputer 17 in response to the user's manipulation of an operation panel 16. More particularly, the frequency dividing ratio of a frequency divider (not shown) contained in the PLL circuit 15 may be controlled to determine the channel selected. A signal $S_{AFT}$ indicative of any change of the intermediate frequency is supplied from signal processor 14 to micro-computer 17 so that an AFT (automatic fine tuning) operation may be carried out for maintaining the intermediate frequency at 402.78 MHz.

The received channel may be selected at random by suitable actuation of a key-pad comprised of ten keys [1] to [0] provided on operation panel 16, or the channel selection may be effected in sequence by actuation of an up-key 161 or a down-key 162 on operation panel 16.

In order to effect random channel selection, the user inputs the numeral corresponding to the desired channel by suitably depressing one or more of the ten keys [1] to [0] on operational panel 16 and then depressing an enter key [ENTER]. As a result of the foregoing, the dividing ratio of the frequency divider contained in PLL circuit 15 is changed by micro-computer 17 so that the resulting changed frequency of the local signal $S_L$ from PLL circuit 15 is suitable for selecting or tuning to the desired channel.

As described above, the plane of polarization of the satellite broadcast signal $S_{BS}$ is either a horizontal or vertical plane of polarization in dependence on the channel. Accordingly, when the received channel is changed, the reception plane of polarization established by polarizer 12a must be matched with the new received channel. A key 163 on operation panel 16 is actuated to change-over the reception plane of polarization. More specifically, the state of a switching signal $S_{PO}$ supplied from micro-computer 17 through an amplifier 18 to a terminal 19 and used to control polarizer 12a to change-over the reception plane of polarization is alternated or changed by successive operations of key 163, thus changing-over the reception plane of polarization established by polarizer 12a.

In order to effect sequential channel selection, the user depresses up-key 161 or down-key 162 provided on operation panel 16. As a result of the foregoing, the dividing ratio of the frequency divider (not shown) contained in PLL circuit 15 is sequentially changed by micro-computer 17 so that the frequency of local signal $S_L$ from PLL circuit 15 is sequentially changed, and hence the received channel is changed in sequence so long as key 161 or 162 is depressed. When up-key 161 is depressed, the received channel is changed in the order of 1,3, . . . 23,2,4, 24,1,3, . . . On the other hand, when down-key 162 is depressed, the received channel is changed in the order of 23,21, . . . ,1,24,22, . . . ,2,23,21, . . . In other words, the received channel is selected from the odd channels in sequence and then from the even channels in sequence, alternately. Further, as described above, the plane of polarization for each odd channel is horizontal and the plane of polarization for each even channel is vertical so that when the selection is changed from among the even channels to among the odd channels, or from among the odd channels, to among the even channels, the reception plane of polarization is suitably changed. In other words, the state of switching signal $S_{PO}$ derived from micro-computer 17 is automatically changed for changing-over the reception plane of polarization only when the channel selection changes from among the odd- or even-numbered channels to among the even-or odd-numbered channels, respectively.

Referring now to the flow chart of FIG. 6 showing the program for the sequential channel selection operation, it will be seen that, in step A following the start of the program, it is determined or decided if either the up-key 161 or the down-key 162 is depressed. If the answer to decision step A is "NO", that step is iterated. If one of the keys 161 and 162 is depressed, the program goes to step 1 or step 9. If up-key 161 is depressed at step 1, "2" is added to the channel number CH at step 2. Then, the program goes to step 3 at which it is determined whether the channel number CH is at least equal to "25", that is, "25" or more. If the channel number CH is less than "25", the program immediately goes to step 4 at which the channel corresponding to the channel number CH is selected. However, when the channel number CH is equal to or more than "25", the program goes from step 3 to step 5. At step 5, it is determined whether the channel number CH is even or odd. If the channel number is odd, the program goes to step 6 at which the channel number "2" is selected. On the other hand, if the channel number is even, the program goes to step 7 at which the channel number CH "1" is selected. From step 6 or step 7, the program goes to step 8. At step 8, the reception plane of polarization is suitably switched and then the channel corresponding to the channel number CH is selected at step 4. From step 4, the program returns to step A which again decides if either of keys 161 and 162 is depressed. So long as the up-key 161 is depressed, the above mentioned operations are repeatedly executed. When the up-key 161 is released, the reception channel number existing at that time is ultimately selected.

When the down-key 162 is depressed at step 9, the program goes to step 10 at which "2" is subtracted from the channel number CH. Then, the program goes to step 11 at which it is decided whether the channel number CH is equal to or less than "0". If the channel number CH is not equal to or less than "0", the program goes to step 4. At step 4, the channel corresponding to the channel number CH is selected. On the other hand, if the channel number CH is equal to or less than "0", the program goes to step 12 at which it is decided whether the channel number CH is even or odd. If the channel number CH is odd, the channel number "24" is selected at step 13. On the other hand, if the channel number is even, the channel number "23" is selected at step 14. After step 13 or 14, the reception plane of polarization is switched at step 8 and the channel corresponding to the channel number CH is selected at step 4 and the program returns to step A. So long as the down-key 162 is depressed, the above mentioned operations are repeatedly executed. When the down-key 162 is released, the reception channel number existing at that time is ultimately selected.

In the course of the above described channel selection, a display section 201 of a display panel 20 (FIG. 3), displays the channel number of the received channel. In the state illustrated on FIG. 3, it will be seen that channel number "6" is selected. When the reception plane of polarization is switched to the horizontal or vertical plane or polarization, a display section 202 (H) or a display section 203 (V), respectively, is illuminated on display panel 20. A display section 204 on display panel 20 is illuminated when a satellite broadcast signal is received. A display section 205 on display panel 20 is illuminated when the received satellite broadcast signal is of a predetermined one of the bands, for example, the ku band or the c band.

The mixed signal $S_O$ (FIG. 4) derived from signal processor 14 is supplied to a de-emphasis circuit 21 in which the signal, which had undergone a pre-emphasis at the transmission side, is de-emphasized or re-converted to the original signal. The output signal from de-emphasis circuit 21 is supplied to a low pass filter 22 from which the video signal $S_V$ is derived. This video signal $S_V$ is amplified by an amplifier 23 and then supplied to an energy dispersal signal eliminating circuit 24. In circuit 24, an energy dispersal signal, which consists of a triangular wave superimposed upon the video signal $S_V$ at the transmission side, is removed from video